April 8, 1930.　　　S. D. LEVINGS　　　1,753,381
STORAGE BATTERY ELECTRODE
Filed May 11, 1926
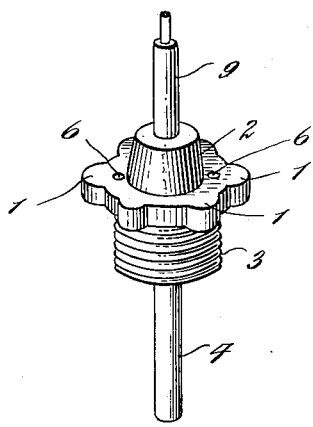
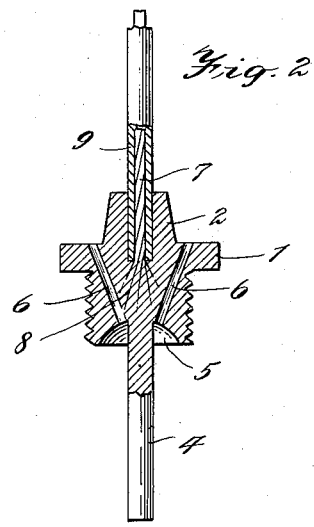
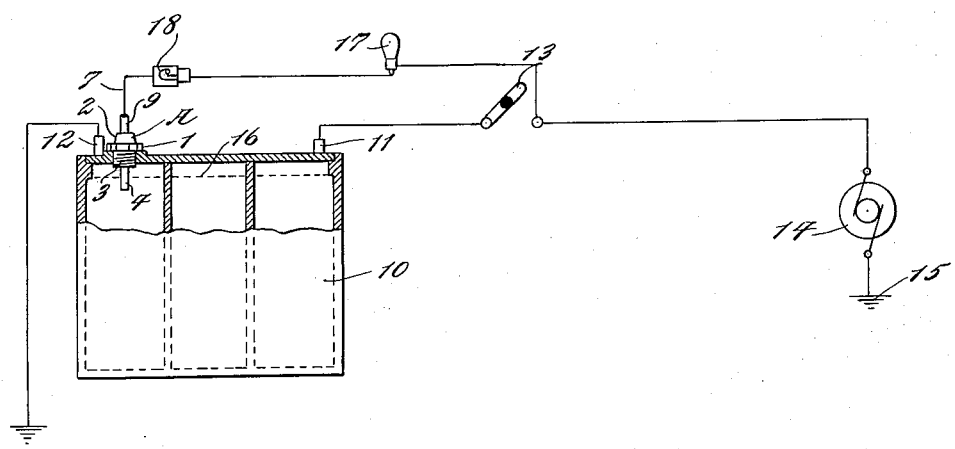
INVENTOR.
Sherburne D. Levings
BY
Gifford & Scull
his ATTORNEYS.

Patented Apr. 8, 1930

1,753,381

UNITED STATES PATENT OFFICE

SHERBURNE D. LEVINGS, OF WINNETKA, ILLINOIS, ASSIGNOR OF ONE-THIRD TO RUFUS N. CHAMBERLAIN AND ONE-THIRD TO GEORGE R. BERGER, BOTH OF CHICAGO, ILLINOIS

STORAGE-BATTERY ELECTRODE

Application filed May 11, 1926. Serial No. 108,218.

My invention relates to electrolyte level electrodes, and particularly to an intermediate electrode for use in conjunction with electrolyte level indicating devices.

Heretofore intermediate electrodes for indicating devices have been built up of separate parts, but such electrodes have the objections of high cost of manufacture and liability of failure of some of the component parts, due both to mechanical as well as chemical damage. These objections have been a decided hindrance to the extensive application and commercial use of such indicating devices.

I have overcome the above difficulties by providing an electrode of simple design and construction; reducing the cost of manufacture and eliminating the liability of failure in operation. These advantages are secured because my device is of a unitary construction which may be cast in its final form, and of such metal as to be non-corrosive in the battery and of a conductivity suitable for its use in connection with electrolyte level indicators.

My invention will be better understood by reference to the following description taken in connection with the accompanying drawings, in which—

Fig. 1 is a perspective view of my electrode in its preferred form;

Fig. 2 is a partial section showing the interior construction of the electrode; and Fig. 3 is a diagram of circuits showing one use to which my electrode may be put.

Referring to Fig. 1, the electrode consists of a unitary piece of metal having a middle or intermediate part 1 provided with an integral upper part 2, a screw-threaded part 3 and a lower depending part 4. The screw-threaded part 3 is adapted to screw into the ordinary opening in the top of storage batteries through which the water is added for replenishing the electrolyte. This, however, is but one form of my device, as a bayonet lock or any other shape may be cast in the electrode for holding it in place, or it may be cast into the cover of the cell. The part 4 extends downwardly from the intermediate part 1 into the electrolyte space of the battery. The length of the part 4 is so adjusted that when the electrolyte falls below the part 4 the battery requires flushing in the usual way.

The intermediate part 1 is provided at its lower extremity with a concavity 5 extending around the depending portion 4. Vent ducts 6 lead from the concavity 5 to the top of the intermediate part 6. Because of the concave character of the lower portion of the intermediate part 1, the electrolyte is not forced out through the vent ducts with the gases. This construction insures the substantial absence of electrolyte on top of the electrode.

A suitable conductor 7, as, for instance, a copper cable, is placed in position and the material of which the parts 1, 2 and 4 are composed is cast around the cable which has some of its strands, as at 8, extending below a sheath 9 of insulating material. The part 2 of the electrode securely fastens the conductor 7 in place, as shown in Fig. 2, thus forming not only an intimate union between the conductor and the electrode, but likewise securely fastening the sheath 9 in place and constituting it for all practical purposes an integral portion of the electrode. The sheath 9 is of stiff material, such as vulcanized rubber and consequently protects the conductor 7 against mechanical injury as well as corrosion from the gases always present in storage batteries.

In Fig. 3, I have shown a circuit diagram illustrating one application for the electrode of my invention. In this figure the battery 10 is provided with the usual end electrodes 11 and 12, the electrode 12 being connected to ground. The electrode 11 connects through a switch 13 with the starting motor 14, or other normally operated switch or mechanism of an automobile, one side of which is grounded at 15. It is desirable for the operator to know when the electrolyte of the battery falls below a given point. In Fig. 3 the normal level of the electrolyte is shown by the dotted line 16. The electrode embodying my invention is inserted at A and the corresponding parts are marked as in Figs. 1 and 2. A lamp or other indicating device 17 is connected in circuit with the intermediate electrode so that when the switch 13 is closed the lamp lights, provided the electrolyte of the battery is in contact with the part 4 of the electrode. If the electrolyte should fall below the part 4, the light 17 would not be illuminated upon the closing of the switch 13, whereupon the operator would known that the battery required flushing.

The particular system in which my electrode has special merit is that shown and described in the patent to Rufus N. Chamberlain, No. 1,558,076, dated October 20, 1925. For convenience in connecting the lamp in circuit a connector is shown at 18.

From the foregoing it will be evident that my electrode has many advantages over any electrode heretofore constructed.

I claim:

An electrode for storage batteries, comprising a portion having means for securing the electrode to the cover of a battery, a depending member integral with said portion and adapted to extend downwardly therefrom into the battery electrolyte, an insulated conductor cast into said portion, and a connector on said conductor, whereby said conductor may be readily disconnected from the circuit and said electrode may be removed from the cover.

SHERBURNE D. LEVINGS.